United States Patent [19]
Gaylo et al.

[11] Patent Number: 5,934,343
[45] Date of Patent: Aug. 10, 1999

[54] METHOD FOR DISPENSING OF POWDERS

[75] Inventors: Christopher M. Gaylo, Princeton Junction; Ireneusz J. Imiolek, Plainfield, both of N.J.

[73] Assignee: Therics, Inc, Princeton, N.J.

[21] Appl. No.: 09/052,179

[22] Filed: Mar. 31, 1998

Related U.S. Application Data

[60] Provisional application No. 60/042,195, Mar. 31, 1997.

[51] Int. Cl.⁶ ........................................................ B65B 1/04
[52] U.S. Cl. ........................... 141/12; 141/73; 425/218; 425/253; 425/447; 264/308
[58] Field of Search ................... 141/12, 73, 74, 141/80, 280, 125; 264/308; 425/218, 253, 447

[56] References Cited

U.S. PATENT DOCUMENTS

| | | | |
|---|---|---|---|
| 4,802,836 | 2/1989 | Whissell | 425/253 |
| 5,387,380 | 2/1995 | Cima et al. | 264/69 |
| 5,647,931 | 7/1997 | Retallick et al. | 156/73.6 |

*Primary Examiner*—Steven O. Douglas
*Attorney, Agent, or Firm*—Gilberto M. Villacorta; Pepper Hamilton LLP

[57] ABSTRACT

A method and apparatus for dispensing and distributing a powder is disclosed which uses a rotary dispenser to dispense the powder by gravity onto a movable platen, the platen being movable to a position adjacent to a build bed, where the powder can be distributed across the build bed using a spreader. The method and apparatus are also suited to dispensing of a plurality of powders used in build beds for solid free-form fabrication and three dimensional printing.

39 Claims, 5 Drawing Sheets

METHOD FOR DISPENSING OF POWDERS

This application claims the benefit of U.S. Provisional Application No. 60/042,195 filing date Mar. 31, 1997.

FIELD OF THE INVENTION

The present invention relates to methods and systems for measuring and dispensing of powders. In particular, the invention relates to a method for measuring and dispensing a powder for use in a three dimensional printing or solid free-form fabrication system.

The construction of articles of manufacture using solid free-form fabrication (SFF) methods has been disclosed in U.S. Pat. No. 5,490,962, and in U.S. Pat. No. 5,387,380 on three-dimensional printing (3DP). These SFF and 3DP methods have the ability to construct a wide range of objects using construction materials in powdered form. A limitation in building practical devices useful for implementing SFF and 3DP methods is a powder handling system that can be used to dispense selected amounts of a variety of powders under computer or manual control, with a minimum of human intervention and with a minimum of cross-contamination between powders. The present invention is a system designed to dispense powders while satisfying these needs.

BACKGROUND OF THE INVENTION

There are many arts which require the measurement of quantities of a powder and the dispensing of such powder. At times a measured powder sample is needed for blending with another powder sample. Pharmaceuticals, powder coatings, confection, powder metallurgy, cosmetics, spices, and flavorings are some examples of areas of technology which have a need for such powder handling methods. There is an especially important need for efficient powder dispensing and distribution in the use of SFF methods. SFF and 3DP use one or more powders dispensed from a reservoir into a container called a build bed to fabricate articles of manufacture. In these methods of fabrication a portion of at least one powder is transferred from the reservoir to the build bed to form a layer of powder. Various techniques are used to form a solid from a portion of the layer of powder. In the case of 3DP a binder is printed onto a layer of powder in a build bed to convert a portion of the layer from a powder into a solid. Successive portions of the same or a different powder are then dispensed and spread over an existing layer in the build bed and subjected to additional printing on selected portions of each successive layer of powder.

It has been disclosed in U.S. Pat. No. 5,204,055 that in a 3DP process a powder being applied in a layer on a build bed can be distributed from a dispensing head passing over a build bed. In U.S. Pat. No. 5,387,380 is disclosed the use of a sieve drum for dispensing powder over a build bed. Both of these disclosed systems and methods of operation suffer from problems. The thickness of a layer of powder deposited on a build bed is known in the art to be an important parameter in how well 3DP or SFF works in manufacturing an article. The thickness of a layer depends on both any method used for compacting the powder, and the amount of powder dispensed onto the build bed. The dispensing head and sieve drum disclosed in these two patents require a complicated multicomponent apparatus adapted for motion over a build bed for their operation. If only one dispensing head or sieve drum is used in a given 3DP or SFF apparatus, then the dispensing head or sieve drum used would require cleaning during a changeover to a second powder if multiple powders were used in the 3DP or SFF fabrication of an article. The complexity of the dispensing head and sieve drum and the risk of cross contamination of powders in a multipowder 3DP or SFF fabrication method are serious disadvantages in the disclosed powder dispensing systems.

SUMMARY OF THE INVENTION

A method for dispensing a powder is disclosed here which uses a rotating cylindrical dispenser to meter measured portions of a powder from a dispensing hopper. A powder dispensed from said hopper is dropped by force of gravity to a platen, said platen being movable horizontally from a first position under said hopper to a second position along a build bed container for containing powder to be consolidated into fabricated articles of manufacture. Any of the SFF methods of fabrication could be used with the invention such as but not limited to 3DP, selective laser sintering, or stereolithography. The method of the present invention discloses distribution of the powder from the platen across the build bed to distribute the powder as a layer over the upper surface of the build bed.

The system repeats the process a selected number of times necessary to deposit a selected number of layers of powder on the build bed. The number of layers is selected by the operator of the system depending on the size of the articles to be fabricated, the nature of the powder or powders used in the build bed, and the amount of detail to be incorporated into the fabricated articles.

By use of an elongate platen in the method of the present invention, multiple powders can be used in fabricating articles using SFF and 3DP. According to the teachings of the invention an elongate platen is mounted under a plurality of hoppers for containing powder. The length of the elongate platen is determined by the length of the hoppers and the distance between the hoppers, a suitable platen extending under each powder hopper being used in the method.

It is an object of the present invention to provide a method for dispensing a powder for use in SFF and especially 3DP which can be automated.

It is an object of the present invention to provide a method for dispensing multiple powders for use in SFF and especially 3DP which can be automated.

It is an object of the present invention to provide a method for dispensing multiple powders for use in SFF and especially 3DP which minimizes the number of mechanical parts necessary in an apparatus used for SFF and 3DP.

It is an object of the present invention to provide a method for dispensing multiple powders for use in SFF and especially 3DP which allows for refilling a powder dispenser while a SFF and 3DP apparatus is in operation.

It is a further object of the present invention to provide a method for dispensing multiple powders for use in SFF and especially 3DP which minimizes cross contamination between the powders used.

A method for dispensing multiple powders is disclosed herein which can be automated and which also provides for the minimization of potential cross contamination between the powders used. A similar method is also disclosed which can be used with only one powder. An apparatus is disclosed which enables the use of the methods disclosed. The methods and apparatus also provide for the distribution of a dispensed powder over a build bed.

The methods of the present invention consist of at least one powder dispensing hopper, a sliding platen to horizontally transport dispensed powder and a powered roller to deliver dispensed powder from the platen to a build bed.

BRIEF DESCRIPTION OF THE DRAWINGS

The invention can be described in more detail with the help of the accompanying drawings wherein.

DETAILED DESCRIPTION OF THE PREFERRED EMBODIMENT

The invention may be understood by consideration of the following description, in conjunction with the drawings provided herewith.

Figure 1:
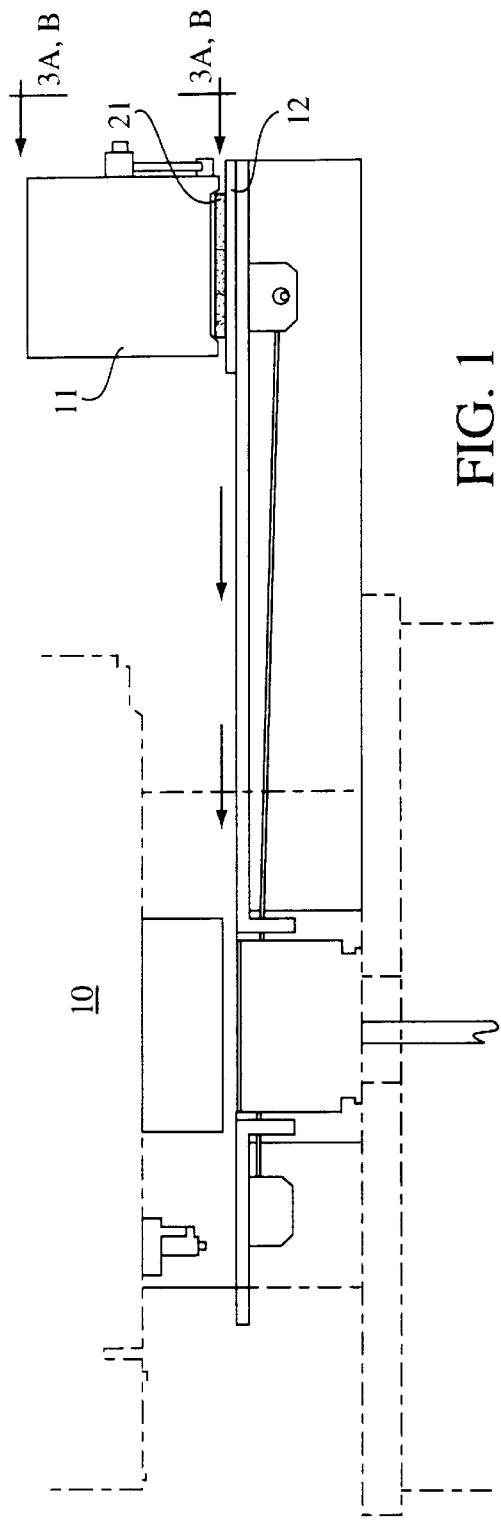
FIG. 1 illustrates a side view of an embodiment of the invention.

In FIG. 1 is shown a side view of an embodiment 10 of the invention. A hopper 11 is shown with a platen 12 below said hopper.

Figure 3A:
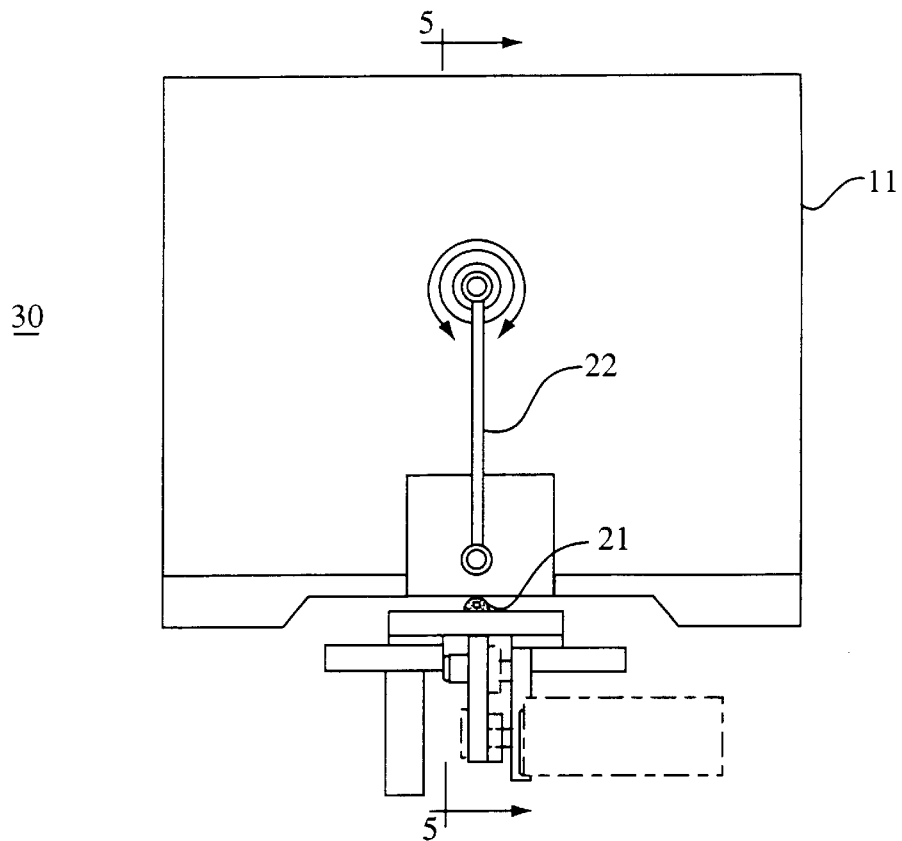
FIG. 3A shows an end view of a hopper in accordance with the invention.
Figure 3B:
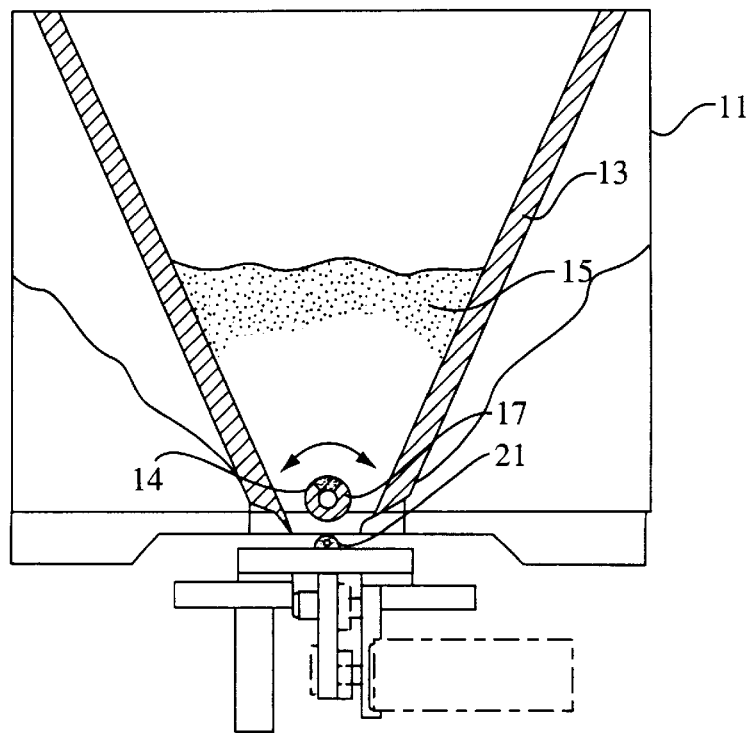
FIG. 3B shows a sectional view of a hopper in accordance with the invention.
Figure 5:
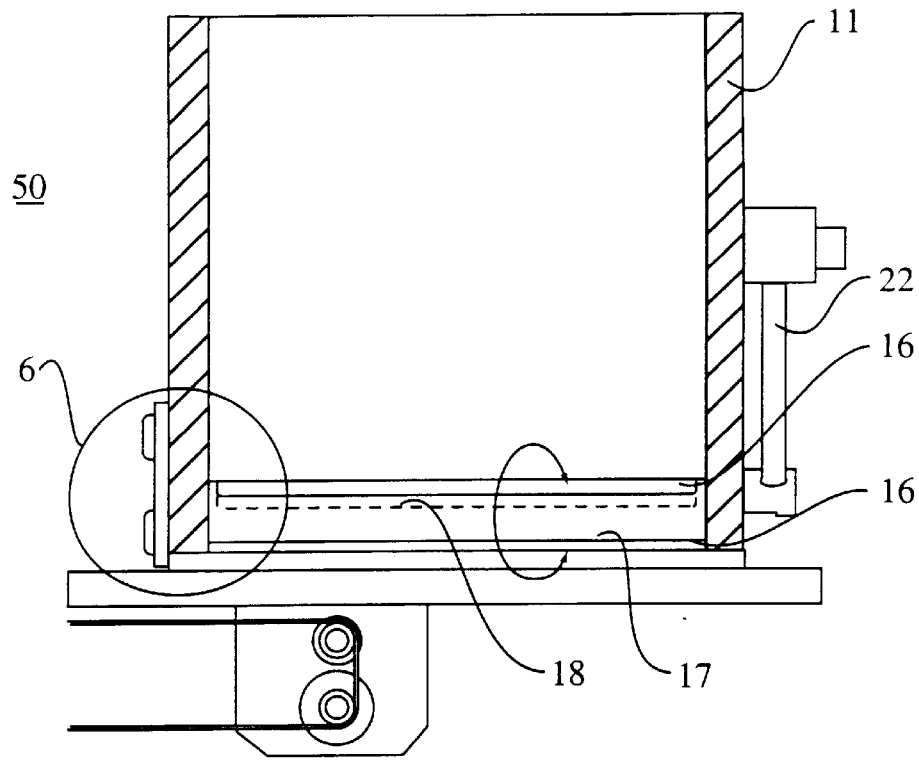
FIG. 5 shows a side view of a powder hopper in accordance with the invention.
Figure 6:
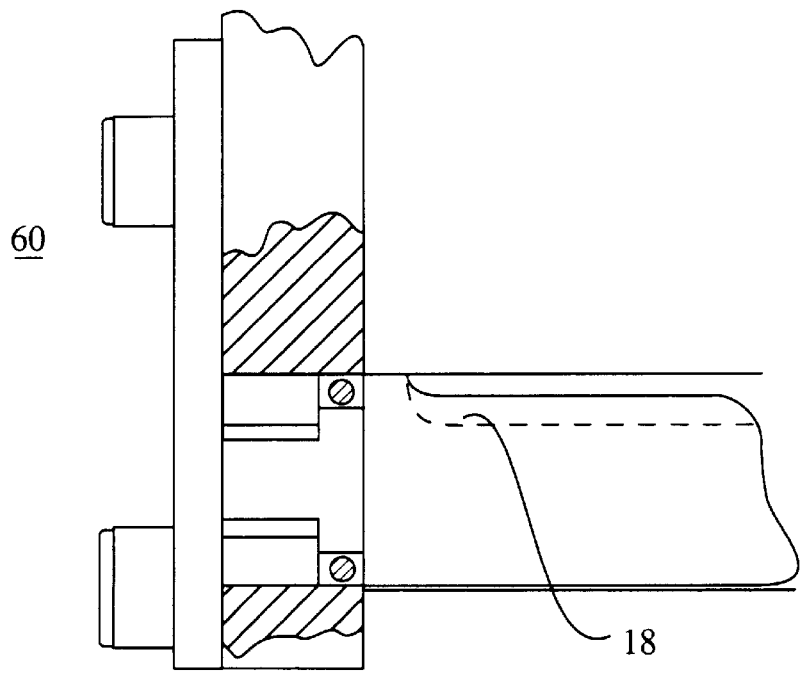
FIG. 6 shows a detail of the powder hopper of FIG. 5.

A powder dispensing hopper according to the teachings of the invention comprises a container volume with sloping walls 13, which can also include internal baffles or channels to assist in the directing of the powder to the bottom of the hopper. Such a hopper 11 is shown in section in FIG. 3B. At the bottom of the hopper is located a rotary dispenser 14 for dispensing a powder 15 from the hopper. The rotary dispenser 14 comprises a cylindrical sleeve 16 in FIG. 5 having a long axis and two opposed side openings parallel to the long axis, having a first opposed side open to an interior of said hopper and having a second opposed side open to an exterior of said hopper, said rotary dispenser further comprising a cylinder 17 sized and shaped to be closely received within said cylindrical sleeve and rotatably mounted within said cylindrical sleeve, said cylinder further having an elongate recess 18 disposed at the surface of said cylinder. With this rotary dispenser, when the recess at the surface of the cylinder is rotated within the cylindrical sleeve to be open to the interior of the hopper, powder contained in the hopper feeds or flows by gravity into said recess. Rotation of the cylinder within the cylindrical sleeve to a position open to the outside of the hopper allows powder within the recess to flow by gravity from the cylinder to a platen 12 in a first position below the hopper. A portion 21 of powder is deposited on the platen as shown in FIG. 5. Rotation of the cylinder to its original orientation in the cylindrical sleeve allows the recess to refill with the powder.

There is an advantage to using a rotary dispenser as disclosed herein. One skilled in the art of SFF and 3DP can determine the size of recess to use in a rotating cylinder of the invention. Adjustment of the size of the recess allows one skilled in the art to determine the amount of a powder to be dispensed on a platen for a given application. By controlling the size of the recess used, the amount of dispensed powder used to form a layer of powder on a build bed is determined. From the area of a build bed and the desired thickness of powder to be distributed over the area, one skilled in the art can calculate the volume of powder to be dispensed onto the platen and distributed over the build bed. For a rotating cylinder made from a hard material such as a metal, the size of a recess to be machined along the length of the cylinder can be calculated.

The operation of the methods of the present invention can be readily automated. The rotation of the rotary dispenser can be controlled by a motor. A motor under computer control can be used with a timing belt to rotate a crank 22 coupled to an end of the rotating cylinder in the rotary dispenser according to the invention, for example.

Figure 2:
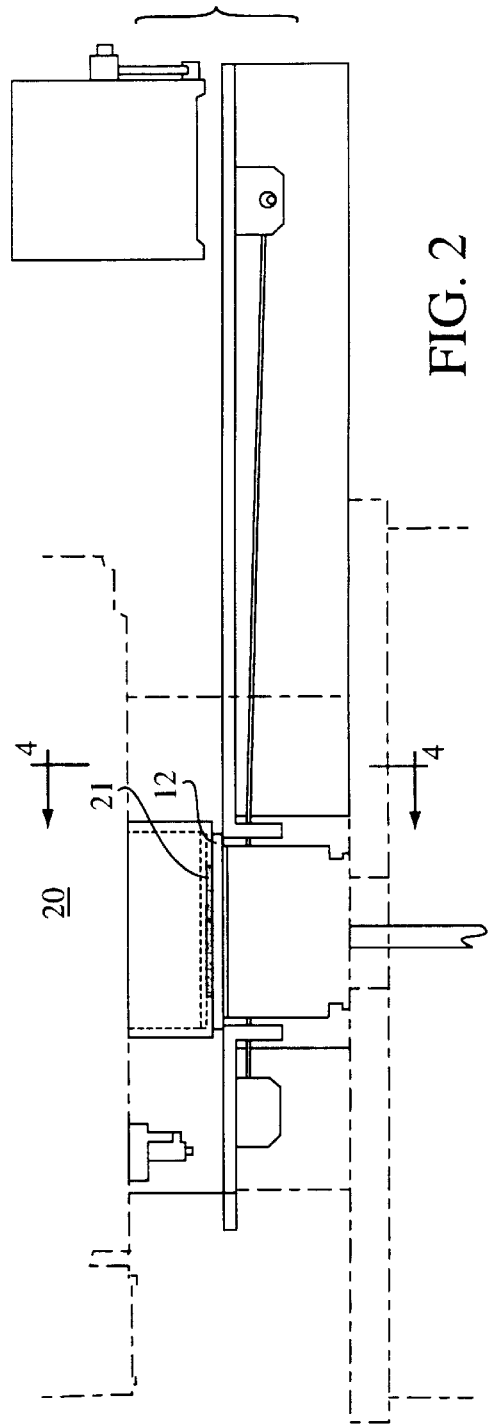
FIG. 2 illustrates a side view of the embodiment of FIG. 1, with a platen in an alternative position.
Figure 4:
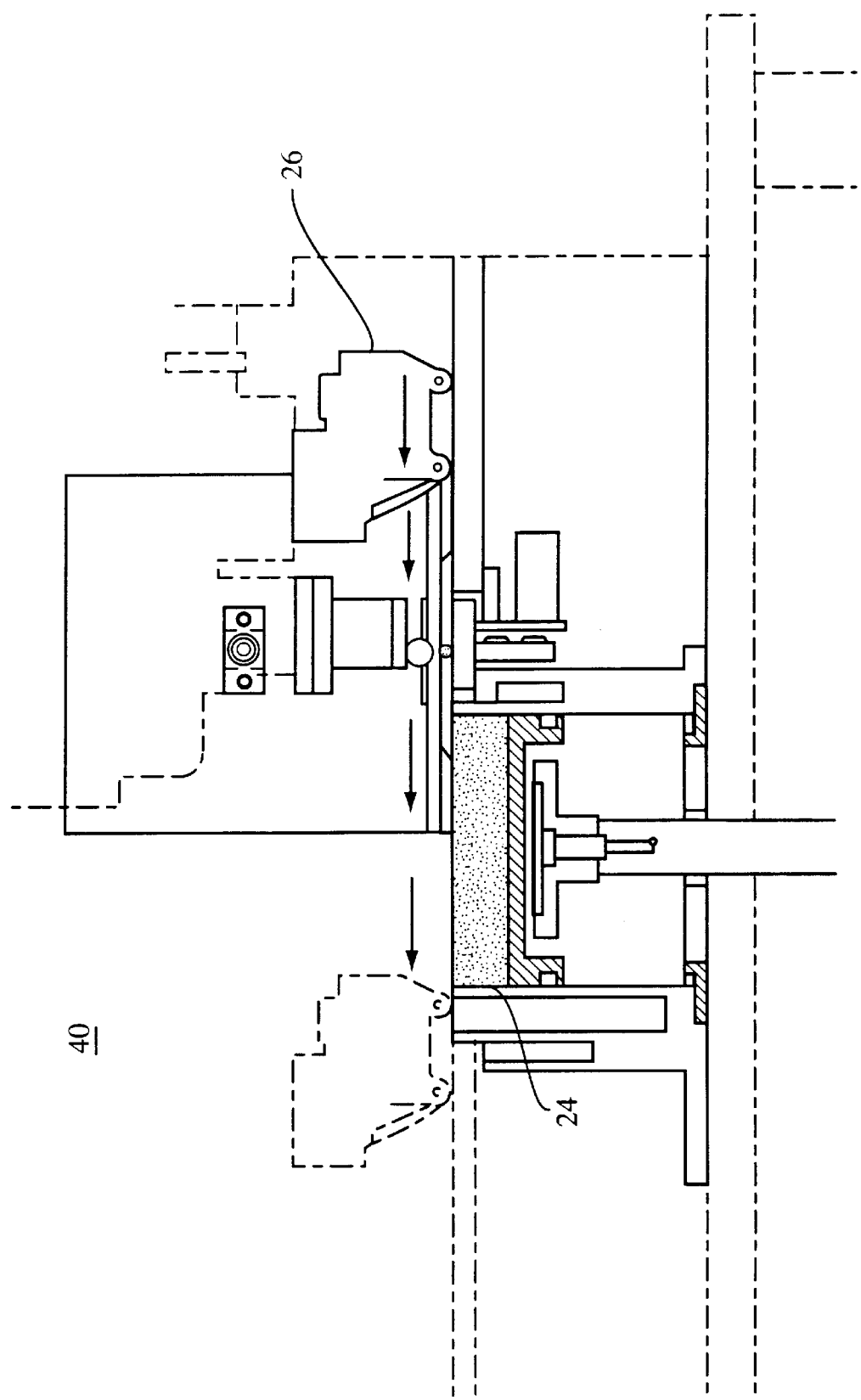
FIG. 4 shows a side view of the embodiment of FIG. 1, taken at right angle to the view of FIG. 1.

In practicing the invention the platen carrying powder is conveyed horizontally along a conveying means from the first position below the hopper to a second position such that the powder on the platen is adjacent to a build bed of a SFF or 3DP fabrication apparatus. FIG. 1 shows such a platen in a first platen position, and FIG. 2 shows such a platen in a second platen position. As shown in FIG. 4, the powder is then distributed from the platen in the second platen position to the build bed 24. The distribution is by means of a spreader 26 where the spreader could be a doctor blade or could be a roller as shown in FIG. 4. The selection of a straight or curved doctor blade, or a roller for distribution of the powder would be made according to the preferences of one skilled in the art of SFF and 3DP. In a preferred embodiment of the invention, a roller is used to distribute a powder from a platen across the build bed. The distribution or spreading of this powder across the build bed provides a new layer of powder for the solid free form fabrication or three dimensional printing process. If a roller is selected for use in distributing a powder, one skilled in the art will readily be able to determine a type of roller to use. The direction of rotation of the roller used could be in the direction of motion of the roller, or counter to the direction of motion. The roller could be vibrated while distributing the powder to compress the powder in the build bed. Optionally, a second roller in addition to the one used for distributing the powder across the build bed could be used to compress the powder in the build bed.

Return of the platen to its original position, and return of the spreader or means for distributing the powder to its original position, allows the method of dispensing and distributing to be repeated as many times as one skilled in the art chooses for a given SFF and 3DP fabrication.

Figure 7:
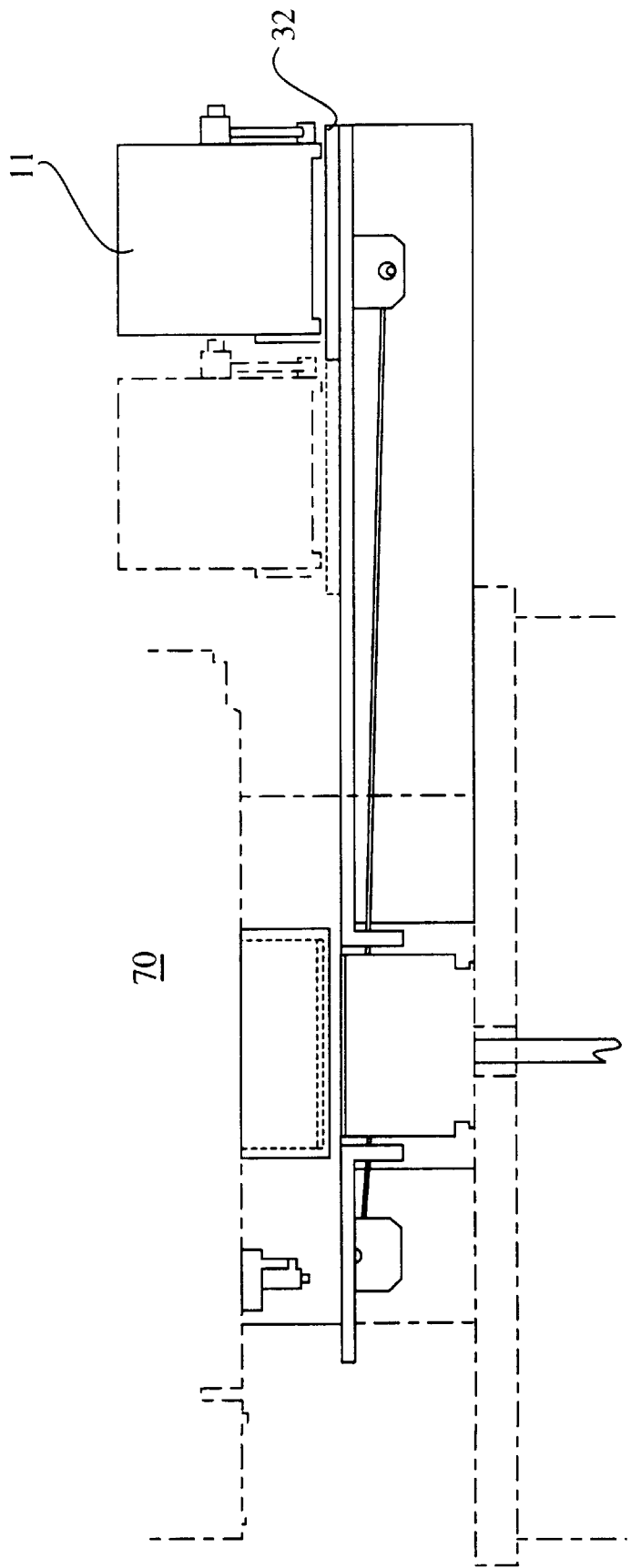
FIG. 7 shows a side view of an alternative embodiment of the invention, the alternative embodiment having two hoppers.

This method lends itself well to operation with a plurality of powders as well as with a single powder. A plurality of hoppers, as shown in FIG. 7, can be arranged in a line extending tangentially to a build bed. An elongate platen 32 is used with the length of the platen at least equal to the length of the line of hoppers. One skilled in the art can readily appreciate that a powder can be selected from a selected hopper, dispensed onto the platen below the line of hoppers, the platen moved to a selected position chosen such that the powder on the platen is adjacent to the build bed, the powder distributed from the platen across the build bed, and the platen and a means used for distributing the powder returned to their original positions. The repetition of the steps of this method as many times as chosen by one skilled in the art will allow multiple powders to be used in a build bed. Since a selected powder will only contact a given portion of the elongate platen used, cross contamination of powders when a plurality of powders is used is therefore minimized.

The number of parts needed to dispense and distribute powders is kept to a minimum in the method of the invention. Only one sliding platen is required for operation, regardless of the number of hoppers.

Powder dispensing can be manually controlled or fully automated. This method ensures that there is minimal cross contamination of powder since each powder is contained in individual hoppers and the hoppers dispense their powder to a unique platen location, which does not overlap any other powder's location. One of the advantages to this method is that only one sliding platen is required for operation, regardless of the number of hoppers. The close proximity of the hoppers to the platen and their location away from the surface on which the powder is to be spread, eliminates or minimizes problems associated with "dusting" of fine powders. The powder hoppers are intended to be removable assemblies, which enable a modular approach and minimizes changeover times from one powder system to the another. The powder hoppers could be along a line to one side of the SFF or 3DP apparatus used, or be arranged along a line on both sides of said apparatus and still be used in accordance with the teachings of the invention.

Although an exemplary embodiment of this invention has been described in detail above, those of ordinary skill in the art will readily appreciate that many modifications are possible in the exemplary embodiment without materially departing from the novel teachings and advantages of this invention. The present invention should not be construed as being limited in any way by the specific embodiment provided herein, which invention is limited solely by the claims that follow.

What is claimed is:

1. A method for dispensing and distributing a powder, comprising the steps of:
    (1) dispensing a powder by gravity feed from a hopper onto a platen, said platen being in a first platen position, where the first platen position is below said hopper;
    (2) conveying said platen horizontally from the first platen position to a second platen position, where the second platen position is adjacent to a build bed;
    (3) distributing said powder from said platen in the second platen position over said build bed with a spreader, said spreader moving horizontally from a first spreader position to a second spreader position to distribute said powder across said build bed;
    (4) returning said spreader from the second spreader position to the first spreader position; and
    (5) returning said platen to the first platen position.

2. The method of claim 1, wherein said spreader comprises a doctor blade.

3. The method of claim 2, wherein said doctor blade has a straight edge for spreading.

4. The method of claim 2, wherein said doctor blade has a curved edge for spreading.

5. The method of claim 1, wherein said spreader comprises an elongate roller for spreading.

6. The method of claim 5, wherein said roller rotates during spreading in a direction counter to the direction of horizontal motion of said roller.

7. The method of claim 1, further comprising a step (6) of compacting the spread powder in said build bed with an elongate roller which is either the spreader roller or a second roller.

8. The method of claim 7, wherein said roller vibrates while compacting said powder.

9. The method of claim 8, wherein said vibration is in a direction essentially orthogonal to a surface of said powder.

10. The method of claim 1, wherein said dispensing is carried out using a rotary dispenser disposed at the bottom of said hopper.

11. The method of claim 10, wherein said rotary dispenser comprises a cylindrical sleeve having a long axis and two opposed side openings parallel to the long axis, having a first opposed side open to an interior of said hopper and having a second opposed side open to an exterior of said hopper, said rotary dispenser further comprising a cylinder sized and shaped to be closely received within said cylindrical sleeve and rotatably mounted within said cylindrical sleeve, said cylinder further having an elongate recess disposed at the surface of said cylinder.

12. A method for dispensing and distributing a plurality of powders, comprising the steps of:
    (1) dispensing a selected powder by gravity feed from a selected powder containing hopper onto a platen, said platen being in a first platen position below said hopper, where said hopper is selected from a plurality of powder containing hoppers;
    (2) conveying said platen horizontally along a conveying means from the first platen position to a second platen position, said second platen position selected along said conveying means such that the selected powder on said platen is adjacent to said build bed;
    (3) distributing said powder from said platen in the second platen position to said build bed with a spreader, said spreader moving horizontally from a first spreader position to a second spreader position to distribute said powder across said build bed;
    (4) returning said spreader from the second spreader position to the first spreader position;
    (5) returning said platen from the second platen position to the first platen position; and
    (6) repeating steps (1), (2), (3), (4) and (5) a selected number of times wherein the powder and the hopper used in each repetition is independently selected.

13. The method of claim 12, wherein said spreader comprises a doctor blade.

14. The method of claim 13, wherein said doctor blade has a straight edge for spreading.

15. The method of claim 13, wherein said doctor blade has a curved edge for spreading.

16. The method of claim 12, wherein said spreader comprises an elongate roller for spreading.

17. The method of claim 16, wherein said roller rotates during spreading in a direction counter to the direction of horizontal motion of said roller.

18. The method of claim 12, further comprising a step (6) of compacting the spread powder in said build bed with an elongate roller which is either the spreader roller or a second roller.

19. The method of claim 18, wherein said roller vibrates while compacting said powder.

20. The method of claim 19, wherein said vibration is in a direction essentially orthogonal to a surface of said powder.

21. The method of claim 12, wherein said dispensing is carried out using a rotary dispenser disposed at the bottom of said hopper.

22. The method of claim 21, wherein said rotary dispenser comprises a cylindrical sleeve having a long axis and two opposed side openings parallel to the long axis, having a first opposed side open to an interior of said hopper and having a second opposed side open to an exterior of said hopper, said rotary dispenser further comprising a cylinder sized and shaped to be closely received within said cylindrical sleeve and rotatably mounted within said cylindrical sleeve, said cylinder further having an elongate recess disposed at the surface of said cylinder.

23. An apparatus for dispensing and distributing powder, comprising:
- a) a hopper for containing a powder to be dispensed;
- b) a rotary dispenser for measuring and dispensing a volume of the powder, said rotary dispenser being mounted horizontally at the bottom of said hopper, and comprising a cylindrical sleeve having a long axis and two opposed side openings parallel to the long axis, having a first opposed side open to an interior of said hopper and having a second opposed side open to an exterior of said hopper, said rotary dispenser further comprising a cylinder sized and shaped to be closely received within said cylindrical sleeve and rotatably mounted within said cylindrical sleeve, said cylinder further having an elongate recess disposed along a surface of said cylinder.
- c) means for rotating said cylinder from a first cylinder position, having the recess open to the interior of said hopper, to a second cylinder position, having the recess open to the exterior of said hopper;
- d) a platen for carrying the powder, said platen disposed horizontally below said hopper and mounted for linear motion along a first axis from a first platen position below and adjacent to said hopper, to a second platen position adjacent to a build bed;
- e) means for distributing the powder from said platen in the second platen position, over said build bed, said distribution means mounted for linear motion along a second axis generally orthogonal to the first axis.

24. The apparatus of claim 23, wherein said means for rotating comprises a rotating crank.

25. The apparatus of claim 24, wherein said rotating crank is motor driven.

26. The apparatus of claim 25, wherein said distribution means comprises an elongate roller.

27. The apparatus of claim 26, wherein said roller rotates during spreading in a direction counter to the direction of horizontal motion of said roller.

28. The apparatus of claim 24, wherein said doctor blade has a straight edge for spreading.

29. The apparatus of claim 24, wherein said doctor blade has a curved edge for spreading.

30. The apparatus of claim 24, wherein said distribution means comprises a doctor blade.

31. The apparatus of claim 24, wherein said distribution means comprises an elongate roller for spreading.

32. The apparatus of claim 24, wherein said roller rotates during spreading in a direction counter to the direction of horizontal motion of said roller.

33. The apparatus of claim 24, wherein said roller vibrates while compacting said powder.

34. The apparatus of claim 33, wherein said vibration is in a direction essentially orthogonal to a surface of said powder.

35. The apparatus of claim 23, wherein said distribution means comprises a doctor blade.

36. The apparatus of claim 23, wherein said distribution means comprises an elongate roller for spreading.

37. The apparatus of claim 36, wherein said roller rotates during spreading in a direction counter to the direction of horizontal motion of said roller.

38. The apparatus of claim 36, wherein said roller vibrates while compacting said powder.

39. The apparatus of claim 38, wherein said vibration is in a direction essentially orthogonal to a surface of said powder.

* * * * *